(12) United States Patent
van Rooyen

(10) Patent No.: US 7,430,438 B2
(45) Date of Patent: *Sep. 30, 2008

(54) METHOD AND SYSTEM FOR MOBILE RECEIVER ANTENNA ARCHITECTURE FOR US BAND CELLULAR AND BROADCASTING SERVICES

(75) Inventor: Pieter Gert Wessel van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 674 days.

This patent is subject to a terminal disclaimer.

(21) Appl. No.: 11/010,487

(22) Filed: Dec. 13, 2004

(65) Prior Publication Data

US 2006/0128421 A1  Jun. 15, 2006

(51) Int. Cl.
H04B 7/00 (2006.01)
H04Q 7/20 (2006.01)

(52) U.S. Cl. .................. 455/552.1; 455/3.02; 455/3.04; 455/12.1; 455/556.1; 725/73; 725/76; 725/147

(58) Field of Classification Search ............. 455/552.1, 455/3.02, 556.1, 3.04, 418, 431, 426.1, 3.01, 455/456.1, 414.1, 12.1, 413, 575.7; 725/112, 725/109, 138, 75–77, 1, 30, 153, 73
See application file for complete search history.

(56) References Cited

U.S. PATENT DOCUMENTS

| | | | |
|---|---|---|---|
| 6,943,746 B2 * | 9/2005 | Talvitie et al. | 343/767 |
| 6,970,718 B2 * | 11/2005 | Iida | 455/553.1 |
| 7,103,374 B2 | 9/2006 | Yla-Jaaski et al. | |
| 2002/0010763 A1 * | 1/2002 | Salo et al. | 709/220 |
| 2002/0059614 A1 * | 5/2002 | Lipsanen et al. | 725/75 |
| 2003/0228892 A1 * | 12/2003 | Maalismaa et al. | 455/575.7 |
| 2004/0198217 A1 * | 10/2004 | Lee et al. | 455/3.01 |
| 2006/0121865 A1 * | 6/2006 | Frank et al. | 455/183.1 |
| 2006/0128304 A1 | 6/2006 | Ramaswamy | |
| 2007/0206631 A1 * | 9/2007 | Parts et al. | 370/465 |
| 2007/0286262 A1 * | 12/2007 | Sestok et al. | 375/148 |

OTHER PUBLICATIONS

Siemens Mobile, *Broadcasting @ Siemens Mobile*, ICM MP, Martin Gebler, Broadcast Media in Mobile, London, Apr. 20, 2004, ICM MP SM BD, IPDC, pp. 1-13.
DVB © Digital Video Broadcasting, *Transmission System for Handheld Terminals (DVB H)*, DVB Document A081, Jun. 2004, pp. 1-11.
DVB © Digital Video Broadcasting, *The Convergence of Broadcast & Telecommunications Platforms*, TM2466 Rev 4, UMTS23Rev1, written by ad hoc Group DVB-UMTS, Editor: Rainer Lueder, Report No. 1 (full), Feb. 6, 2002, pp. 1-73.

* cited by examiner

*Primary Examiner*—Sujatha Sharma
(74) *Attorney, Agent, or Firm*—McAndrews, Held & Malloy, Ltd.

(57) ABSTRACT

A method for an antenna architecture that handles US band cellular and broadcast channels may be provided. The method may comprise receiving at a first radio frequency integrated circuit (RFIC) integrated within a mobile terminal, first signals via a first antenna, where the first signals comprise signals within a 1900 MHz band. The method may further comprise receiving at a second RFIC integrated within the mobile terminal, second signals via the first antenna, where the second signals comprise signals within at least one of a 1900 MHz band and a 850 MHz band and receiving at a third RFIC integrated within the mobile terminal, third signals via the first antenna, where the third signals comprise signals within a VHF/UHF broadcast band.

58 Claims, 14 Drawing Sheets

METHOD AND SYSTEM FOR MOBILE RECEIVER ANTENNA ARCHITECTURE FOR US BAND CELLULAR AND BROADCASTING SERVICES

CROSS-REFERENCE TO RELATED APPLICATIONS/INCORPORATION BY REFERENCE

This application makes reference to:
U.S. patent application Ser. No. 11/010,991, filed Dec. 13, 2004;
U.S. patent application Ser. No. 11/010,847, filed Dec. 13, 2004;
U.S. patent application Ser. No. 11/010,461, filed Dec. 13, 2004;
U.S. patent application Ser. No. 11/010,877, filed Dec. 13, 2004;
U.S. patent application Ser. No. 11/010,914, filed Dec. 13, 2004;
U.S. patent application Ser. No. 11/001,486, filed Dec. 13, 2004;
U.S. patent application Ser. No. 11/010,903, filed Dec. 13, 2004;
U.S. patent application Ser. No. 11/011,009, filed Dec. 13, 2004;
U.S. patent application Ser. No. 11/010,855, filed Dec. 13, 2004;
U.S. patent application Ser. No. 11/010,743, tiled Dec. 13, 2004;

All of the above stated applications are hereby incorporated herein by reference in their entirety.

FIELD OF THE INVENTION

Certain embodiments of the invention relate to mobile receivers. More specifically, certain embodiments of the invention relate to a method and system for a mobile receiver antenna architecture that supports US band cellular services and broadcasting services.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates that may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 μs for an 8 MHz channel. In the "8K" mode there are 6,817 carrier frequencies, each with a useful symbol duration of 896 μs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level, which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 μs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

W-CDMA is one of the third-generation radio interface technologies that has been optimized for wide-band radio access, to support high-speed multimedia services such as video conferencing and the Internet, as well as voice calls. W-CDMA may allow the wireless bandwidth to be tailored to the needs of each individual call, whether it is in a voice, data or multimedia format and it may be able to handle both packet and circuit-switched services. The broadcast channel may comprise several logical channels that may be multiplexed onto one communications channel that is continuously broadcast from a cell site and provides the mobile terminal with system information, lists of neighboring radio channels and other system configuration information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method for an antenna architecture that handles US band cellular and broadcast channels may be provided. The method may comprise receiving at a first radio frequency integrated circuit (RFIC) integrated within a mobile terminal, first signals via a first antenna, where the first signals comprise signals within a 1900 MHz band. The method may further comprise receiving at a second RFIC integrated within the mobile terminal, second signals via the first antenna, where the second signals comprise signals within at least one of a 1900 MHz band and a 850 MHz band and receiving at a third RFIC integrated within the mobile terminal, third signals via the first antenna, where the third signals comprise signals within a VHF/UHF broadcast band. The first RFIC may be a WCDMA/HSDPA RFIC. The second RFIC may be a GSM RFIC and the third RFIC may be a DVB RFIC.

In another embodiment of the invention, a system for an antenna architecture that handles US band cellular and broadcast channels may be provided. The system may comprise a first radio frequency integrated circuit (RFIC) integrated within a mobile terminal coupled to at least a first antenna capable of handling signals within the 2100 MHz band. A second RFIC may be integrated within the mobile terminal coupled to the first antenna capable of handling signals within the 1800 MHz band and the 900 MHz band. A third RFIC may be integrated within the mobile terminal coupled to the first antenna capable of handling signals within the VHF/UHF broadcast band. The first RFIC may be a WCDMA/HSDPA RFIC. The second RFIC may be a GSM RFIC and the third RFIC may be a DVB RFIC.

The system may comprise circuitry that couples the first RFIC to the first antenna via a first switch and a diplexer. The second RFIC may be coupled to the first antenna via the first switch and the diplexer. The third RFIC may be coupled to the first antenna via a second switch and the diplexer. The second RFIC may also be coupled to the first antenna via the second switch and the diplexer. An output of the first RFIC may be coupled to an input of at least a first amplifier. An output of the first amplifier may be coupled to an input of at least a first polyphase filter. An output of the first polyphase filter may be coupled to an input of the first switch. An output of the first switch may be coupled to an input of at least a second polyphase filter. An output of the second polyphase filter may be coupled to an input of at least a second amplifier. An output of the second amplifier may be coupled to an input of at least a third polyphase filter. An output of the third polyphase filter may be coupled to an input of a first divider. An output of the first divider may be coupled to an input of the first RFIC capable of handling signals within the 1900 MHz band and an input of the second RFIC capable of handling signals within the 1900 MHz band. An output of the second RFIC may be coupled to an input of at least a third amplifier. An output of the third amplifier may be coupled to the input of the first switch in a transmit path capable of handling signals within the 1900 MHz band. The third amplifier may be a power amplifier. An output of the second RFIC may be coupled to an input of at least a fourth amplifier. The fourth amplifier may be a power amplifier.

An output of the second RFIC may be coupled to an input of at least the fifth amplifier. An output of the fifth amplifier may be coupled to an input of at least a fourth polyphase filter. An output of the fourth polyphase filter may be coupled to an input of the second switch. An output of the second switch may be coupled to an input of at least a fifth polyphase filter. An output of the fifth polyphase filter may be coupled to an input of at least a sixth amplifier. An output of the sixth amplifier may be coupled to an input of at least a sixth polyphase filter. An output of the sixth polyphase filter may be coupled to an input of a second divider. An output of the second divider may be coupled to an input of the first RFIC capable of handling signals within the 850 MHz band and an input of the second RFIC capable of handling signals within the 850 MHz band. The output of the second switch may be coupled to an input of the third RFIC. The first antenna may be coupled to an input of the third RFIC.

The second antenna may be coupled to a first RFIC via a first switch. The second antenna may be coupled to the second RFIC via the first switch. The third antenna may be coupled to the second RFIC via the second switch. The second antenna may be coupled to an input of the first switch. The third antenna may be coupled to an input of the second switch. A fourth antenna may be coupled to the first RFIC via a fourth polyphase filter in a transmit path capable of handling signals within the 850 MHz band. The fourth antenna may be coupled to the first RFIC and the second RFIC via a fifth polyphase filter in a receive path capable of handling signals within the 850 MHz band. The fourth antenna may be coupled to an input of the fifth polyphase filter. A fifth antenna may be coupled to the second RFIC via a fourth amplifier in a transmit path capable of handling signals within the 850 MHz band. The fourth amplifier may be coupled to the fifth antenna.

A sixth antenna may be coupled to the first RFIC via a first polyphase filter in a transmit path capable of handling signals within the 1900 MHz band. The sixth antenna may be coupled to the first RFIC and the second RFIC via a second polyphase filter in a receive path capable of handling signals within the 1900 MHz band. The sixth antenna may be coupled to an input of the second polyphase filter. A seventh antenna may be coupled to the second RFIC via a third amplifier in a transmit path capable of handling signals within the 1900 MHz band. An output of the third amplifier may be coupled to the seventh antenna. An eighth antenna may be coupled to the first RFIC and the second RFIC via a sixth amplifier and a sixth polyphase filter in a receive path capable of handling signals within the 850 MHz band. The sixth amplifier may be a low noise amplifier. A ninth antenna may be coupled to the first RFIC via a fifth amplifier in a transmit path capable of handling signals within the 850 MHz band. The fifth amplifier may be a power amplifier. A tenth antenna may be coupled to the first RFIC and the second RFIC via a second amplifier and a third polyphase filter in a receive path capable of handling signals within the 1900 MHz band. The second amplifier may be a low noise amplifier. An eleventh antenna may be coupled to the first RFIC via a first amplifier in a transmit path capable of handling signals within the 1900 MHz band. The first amplifier may be a power amplifier.

These and other advantages, aspects and novel features of the present invention, as well as details of an illustrated embodiment thereof, will be more fully understood from the following description and drawings.

DETAILED DESCRIPTION OF THE INVENTION

A method for an antenna architecture that handles US band cellular and broadcast channels may be provided. The method may comprise receiving at a first radio frequency integrated circuit (RFIC) integrated within a mobile terminal, first signals via a first antenna, where the first signals comprise signals within a 1900 MHz band. The method may further comprise receiving at a second RFIC integrated within the mobile terminal, second signals via the first antenna, where the second signals comprise signals within at least one of a 1900 MHz band and a 850 MHz band and receiving at a third RFIC integrated within the mobile terminal, third signals via the first antenna, where the third signals comprise signals within a VHF/UHF broadcast band.

Figure 1A:
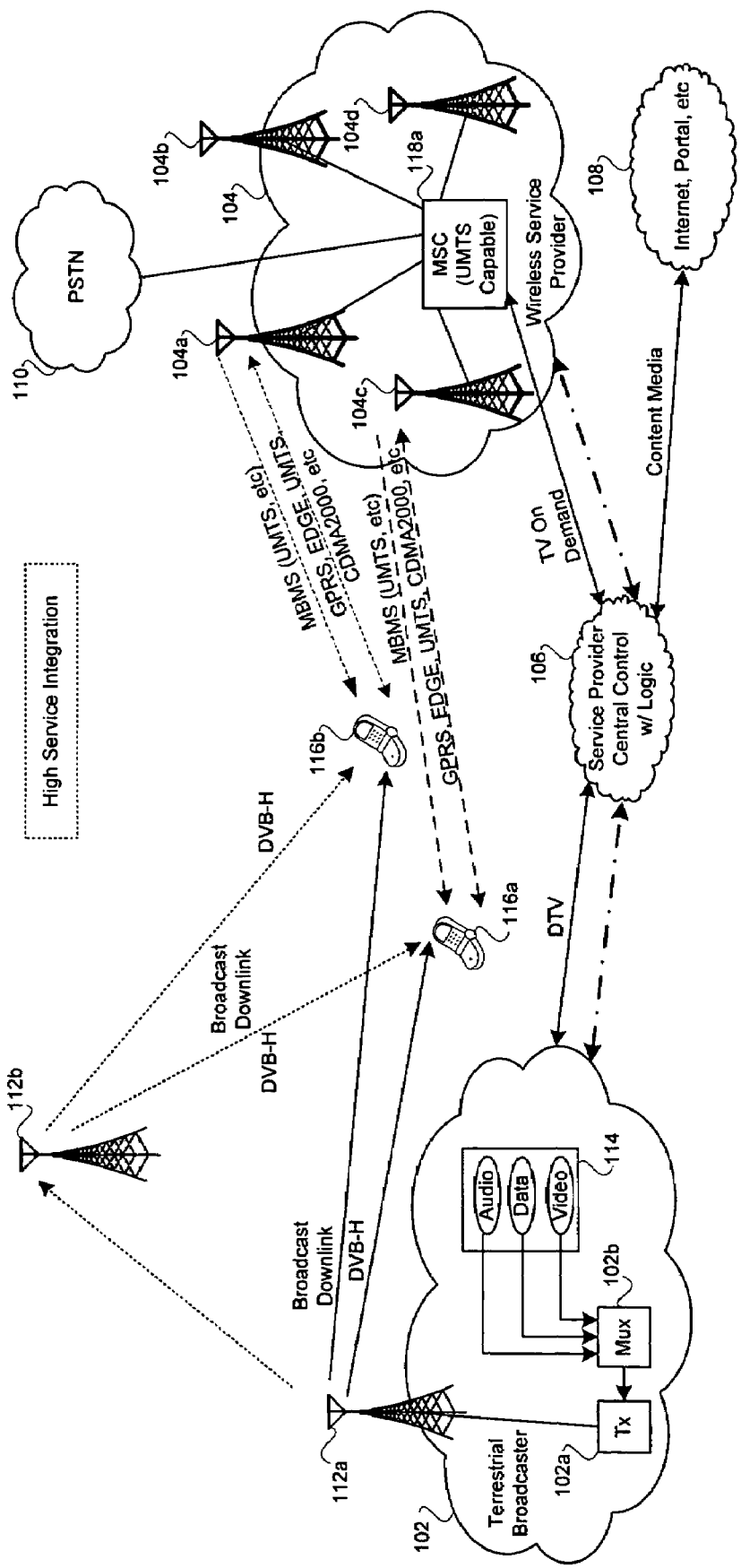
FIG. 1a is a block diagram of an exemplary system for providing integrated services between a cellular network and a digital video broadcast network, in accordance with an embodiment of the invention.

FIG. 1a is a block diagram of an exemplary system for providing integrated services between a cellular network and a digital video broadcast network, in accordance with an embodiment of the invention. Referring to FIG. 1a, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118a.

Although communication links between the terrestrial broadcast network 102 and the service provider 106, and also the communication links between the service provider 106 and the wireless service provider 104 may be wired communication links, the invention may be not so limited. Accordingly, at least one of these communication links may be wireless communication links. In an exemplary embodiment of the invention, at least one of these communication links may be an 802.x based communication link such as 802.16 or WiMax broadband access communication link. In another exemplary embodiment of the invention, at least one of these connections may be a broadband line of sight (LOS) connection.

The wireless service provider network 104 may be a cellular or personal communication service (PCS) provider that may be adapted to handle broadcast UMTS (B-UMTS). The term cellular as utilized herein refers to both cellular and PCS frequencies bands. Hence, usage of the term cellular may comprise any band of frequencies that may be utilized for cellular communication and/or any band of frequencies that may be utilized for PCS communication. Notwithstanding, broadcast UMTS (B-UMTS) may also be referred to as MBMS. MBMS is a high-speed data service that is overlaid on WCDMA to provide much higher data rates than may be provided by core WCDMA. In this regard, the B-UMTS services may be superimposed on the cellular or PCS network.

The wireless service provider network 104 may utilize cellular or PCS access technologies such as GSM, CDMA, CDMA2000, WCDMA, AMPS, N-AMPS, and/or TDMA. The cellular network may be utilized to offer bidirectional services via uplink and downlink communication channels, while the B-UMTS or MBMS network may be utilized to provide a unidirectional broadband services via a downlink channel. The B-UMTS or MBMS unidirectional downlink channel may be utilized to broadcast content media and/or multimedia type information to the mobile terminals 116a and 116b. Although MBMS provides only unidirectional downlink communication, the invention may be not so limited. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the terrestrial broadcast network 102 and/or a load on the wireless service provider network 104. Load management may be utilized to distribute the flow of information throughout the terrestrial broadcast network 102 and/or a load on the wireless service provider network 104. For example, if information is to be broadcasted via the wireless service provider network 104 to a plurality of mobile terminals within a particular cell handled by the base station 104a and it is determined that this may overload the wireless service provider network 104, then the terrestrial broadcast network 102 may be configured to broadcast the information to the mobile terminals.

The service provider 106 may also be adapted to handle certain types of service requests, which may have originated from a mobile terminal. For example, the mobile terminal 116a may request that information be delivered to it via a downlink VHF/UHF broadcast channel. However, a downlink VHF/UHF broadcast channel may be unavailable for the delivery of the requested information. As a result, the service provider 106 may route the requested information through an MBMS channel via the base station 104c to the mobile terminal 116a. The requested information may be acquired from the content source 114 and/or the portal 108. In another example, the mobile terminal 116b may request that information be delivered to it via a downlink cellular channel. However, the service provider 106 may determine that delivery of the information is not critical and/or the cheapest way to deliver to the mobile terminal 116b is via a downlink VHF/UHF broadcast channel. As a result, the service provider 106 may route the requested information from the portal 108 or content service 114 to the mobile terminal 116b. The service provider 106 may also have the capability to send at least a portion of information to be delivered to, for example, mobile terminal 116a via the VHF/UHF broadcast channel and a remaining portion of the information to be delivered via the cellular broadcast channel.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118a. Accordingly, the MSC 118a may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a B-UMTS from the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast VHF/UHF technologies. In an exemplary embodiment of the invention, the mobile terminals 116a, 116b may be adapted to utilize one or more cellular access technologies such as GSM, GPRS, EDGE, CDMA, WCDMA, CDMA2000, HSDPA and MBMS (B-UMTS). The mobile terminal may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may also be adapted to receive VHF/UHF broadcast information from either the base stations 104a, 104b, 104c, 104d or the VHF/UHF broadcast antennas 112a and 112b. In instances where a mobile terminal receives broadcast information from any of the base stations 104a, 104b, 104c, or 104d via a downlink MBMS communication channel, then the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal may be adapted to utilize a single broadcast integrated circuit for receiving and processing VHF/UHF channels, and a single cellular integrated circuit for receiving and processing cellular or PCS channels. In this regard, the single cellular integrated circuit may be adapted to handle different cellular access technologies. For example, at least one of the cellular integrated circuit may be adapted to handle GSM, and at least one of the cellular integrated circuits may be adapted to handle WCDMA. For broadcast channels, the single broadcast integrated circuit may be adapted to handle at least one VH/UHF channel. Each of the mobile terminals may comprise a single memory interface that may be adapted to handle processing of the broadcast communication information and processing of cellular communication information. In this regard, an uplink cellular communication path may be utilized to facilitate receiving of broadcast information via a broadcast communication path.

In another embodiment of the invention, a mobile terminal may be adapted to utilize a single integrated circuit for receiving and processing broadcast VHF/UHF channels, and for receiving and processing cellular or PCS channels. In this regard, the single broadcast and cellular integrated circuit may be adapted to handle different cellular access technologies. For example, the single integrated circuit may comprise a plurality of modules each of which may be adapted to receive and process a particular cellular access technology or a VHF/UHF broadcast channel. Accordingly, a first module may be adapted to handle GSM, a second module may be adapted to handle WCDMA, and a third module may be adapted to handle at least one VHF/UHF channel.

Figure 1B:
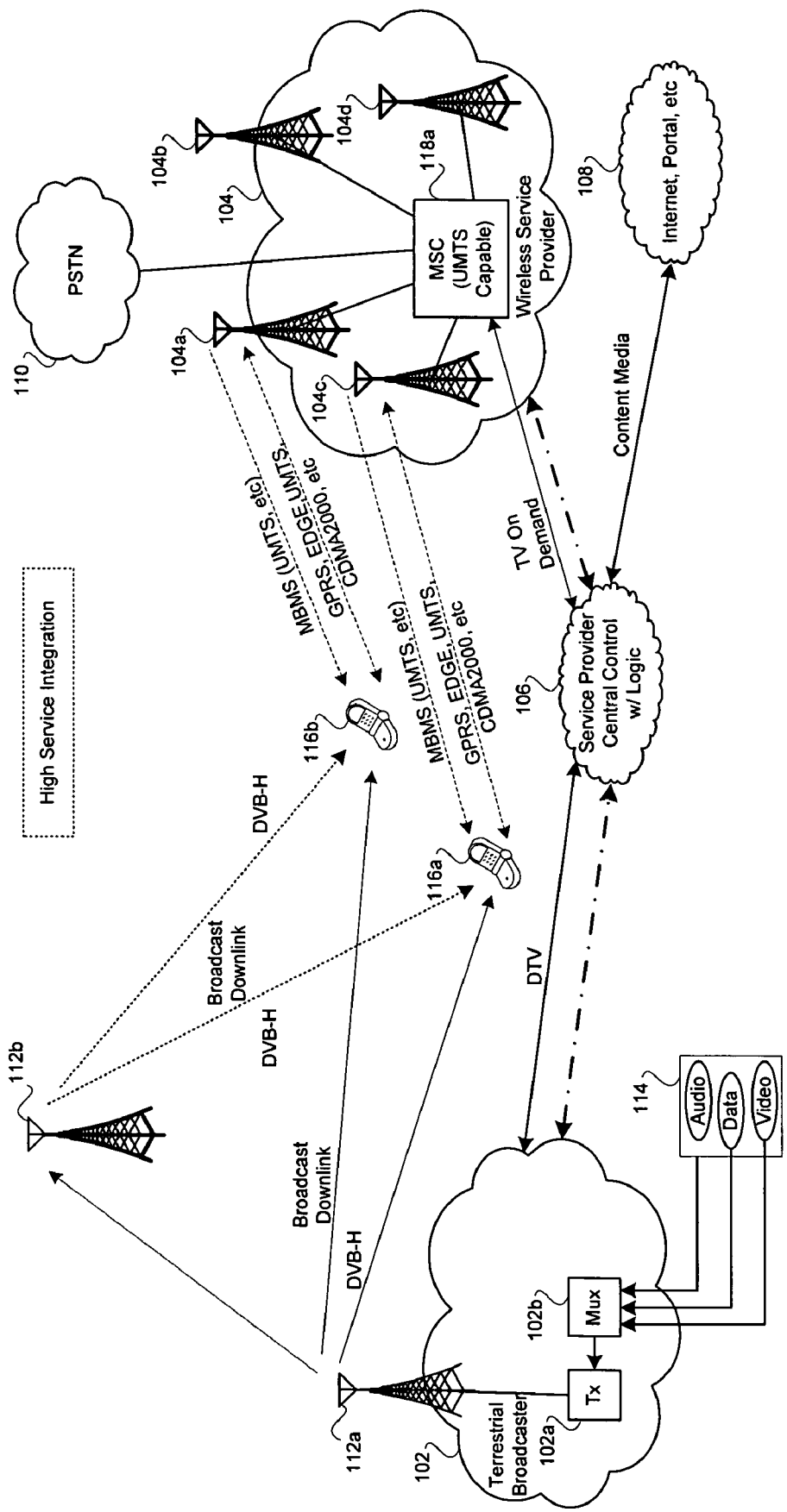
FIG. 1b is a block diagram of an alternative embodiment of the exemplary system of FIG. 1a for providing integrated services between a cellular network and a digital video broadcast network, in accordance with an embodiment of the invention.

FIG. 1b is a block diagram of an alternative embodiment of the exemplary system of FIG. 1a for providing integrated services between a cellular network and a digital video broadcast network, in accordance with an embodiment of the invention. Referring to FIG. 1b, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. Although VHF/UHF broadcast antenna 112b is illustrated separately from the terrestrial broadcast network 102, it may still be part of the terrestrial broadcast network 102. The wireless service provider network 104 may comprise mobile switching center (MSC) 118a, and a plurality of cellular base stations 104a, 104b, 104c, and 104d.

The system of FIG. 1b is somewhat similar to the FIG. 1a with the exception that FIG. 1b has the content source 114 located external to the terrestrial broadcast network 102. The content source 114, which may also be referred to as a data carousel, may comprise audio, data and video content. At least a portion of the audio, data and/or video content stored in the content source 114 may be linked so that if information cannot be retrieved from the content source 114, then it may be received from the portal 108. In the system of FIG. 1b, a provider other than the terrestrial broadcaster 102 may manage the content source 114. Notwithstanding, the audio, video and/or data from the content source 114 may still be multiplexed by the multiplexer 102b in the terrestrial broadcast network 114.

Figure 1C:
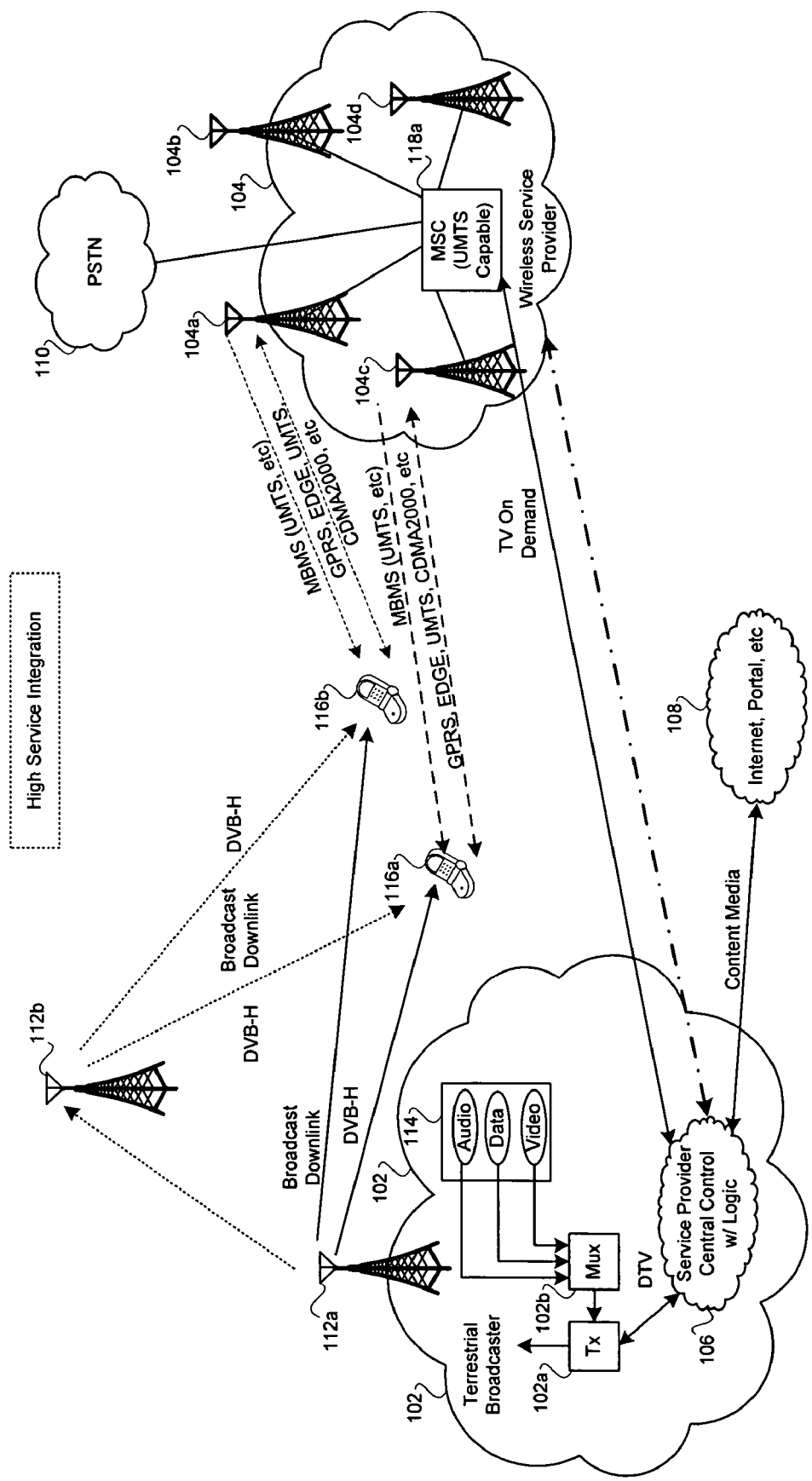
FIG. 1c is a block diagram of an alternative embodiment of the exemplary system of FIG. 1a for providing integrated services between a cellular network and a digital video broadcast network, in accordance with an embodiment of the invention.

FIG. 1c is a block diagram of an alternative embodiment of the exemplary system of FIG. 1a for providing integrated services between a cellular network and a digital video broadcast network, in accordance with an embodiment of the invention. Referring to FIG. 1c, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, service provider 106, and VHF/UHF broadcast antennas 112a and 112b. The wireless service provider network 104 may comprise mobile switching center (MSC) 118a, and a plurality of cellular base stations 104a, 104b, 104c, and 104d.

The system of FIG. 1c is somewhat similar to the FIG. 1a with the exception that FIG. 1b has the service provider 106 co-located with the terrestrial broadcast network 102. In this regard, the terrestrial broadcast network 102 may control the functions of the service provider 106. Since the terrestrial broadcast network 102 controls the functions of the service provider, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider, the integrated control and logic services provided the terrestrial broadcaster network 102 and service provider 106 may instantly make decisions of how best to handle information for a mobile terminal.

Figure 1D:
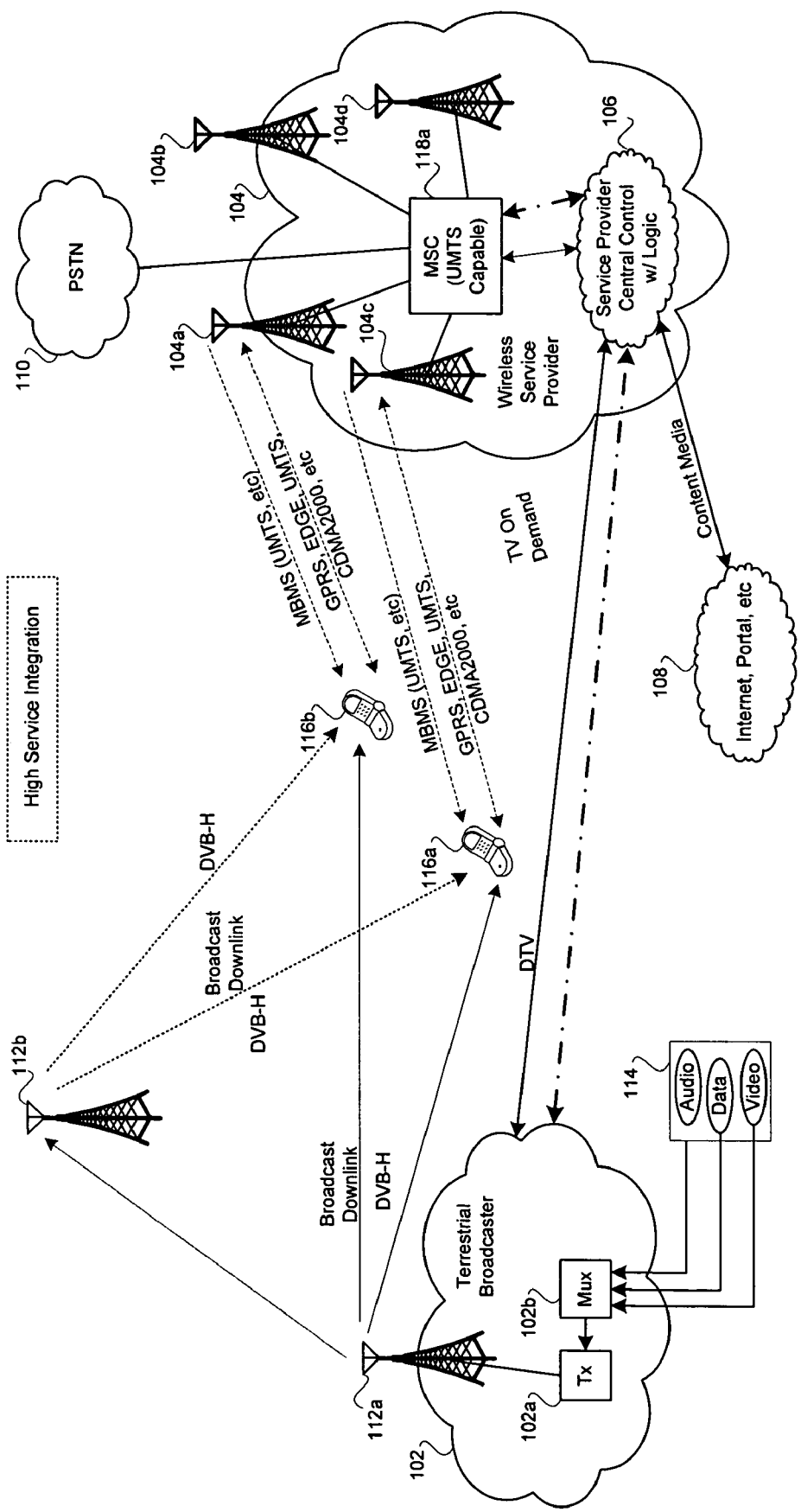
FIG. 1d is a block diagram of an alternative embodiment of the exemplary system of FIG. 1a for providing integrated services between a cellular network and a digital video broadcast network, in accordance with an embodiment of the invention.

FIG. 1*d* is a block diagram of an alternative embodiment of the exemplary system of FIG. 1*a* for providing integrated services between a cellular network and a digital video broadcast network, in accordance with an embodiment of the invention. Referring to FIG. 1*d*, there is shown terrestrial broadcaster network 102, wireless service provider network 104, portal 108, public switched telephone network 110, and mobile terminals (MTs) 116*a* and 116*b*. The terrestrial broadcaster network 102 may comprise transmitter (Tx) 102*a*, multiplexer (Mux) 102*b*, and VHF/UHF broadcast antennas 112*a* and 112*b*. The wireless service provider network 104 may comprise service provider 106, mobile switching center (MSC) 118*a*, and a plurality of cellular base stations 104*a*, 104*b*, 104*c*, and 104*d*.

The system of FIG. 1*d* is somewhat similar to the FIG. 1*a* with the exception that FIG. 1*b* has the service provider 106 co-located with the wireless service provider network 104. In this regard, the wireless service provider network 104 may control the functions of the service provider 106. Since the wireless service provider network 104 controls the functions of the service provider 106, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider 106 as illustrated in FIG. 1*a*, the integrated control and logic services provided the service provider 106 may instantly make decisions of how best to handle communication of information for a mobile terminal.

In another embodiment of the invention, since many of the services provided by the service provider 106 may already be integrated into the wireless service provider's 104 infrastructure, then the complexity of the service provider functions may be significantly reduced. For example, the wireless service provider 104, the latter of which already has the pertinent infrastructure in place, may now handle operation administration maintenance and provisioning (OAM&P) functions, which may be required by the service provider 106. Since the uplink capabilities are inherent in only the wireless service provider network 104, and the service provider function are also located within the service provider network 106, the uplink capabilities for the mobile stations 116*a*, 116*b* may be more efficiently managed from within the wireless service provider network 104.

Figure 1E:
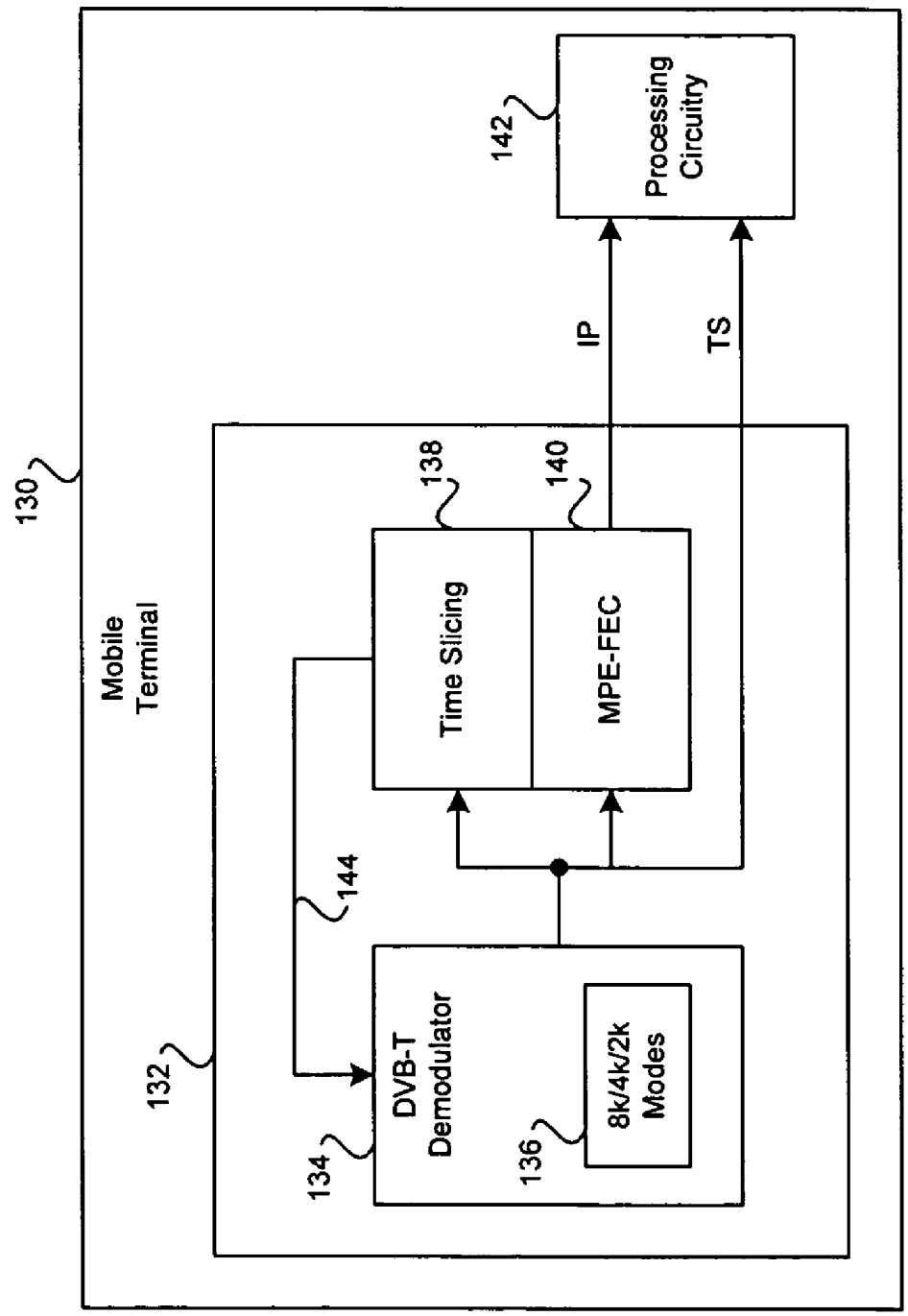
FIG. 1e is a high-level block diagram of exemplary DVB-H receiver circuitry in a mobile terminal, which may be utilized in connection with an embodiment of the invention.

FIG. 1*e* is a high-level block diagram of exemplary DVB-H receiver circuitry in a mobile terminal, which may be utilized in connection with an embodiment of the invention. Referring to FIG. 1*e*, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2 k, 4 k and/or 8 k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1F:
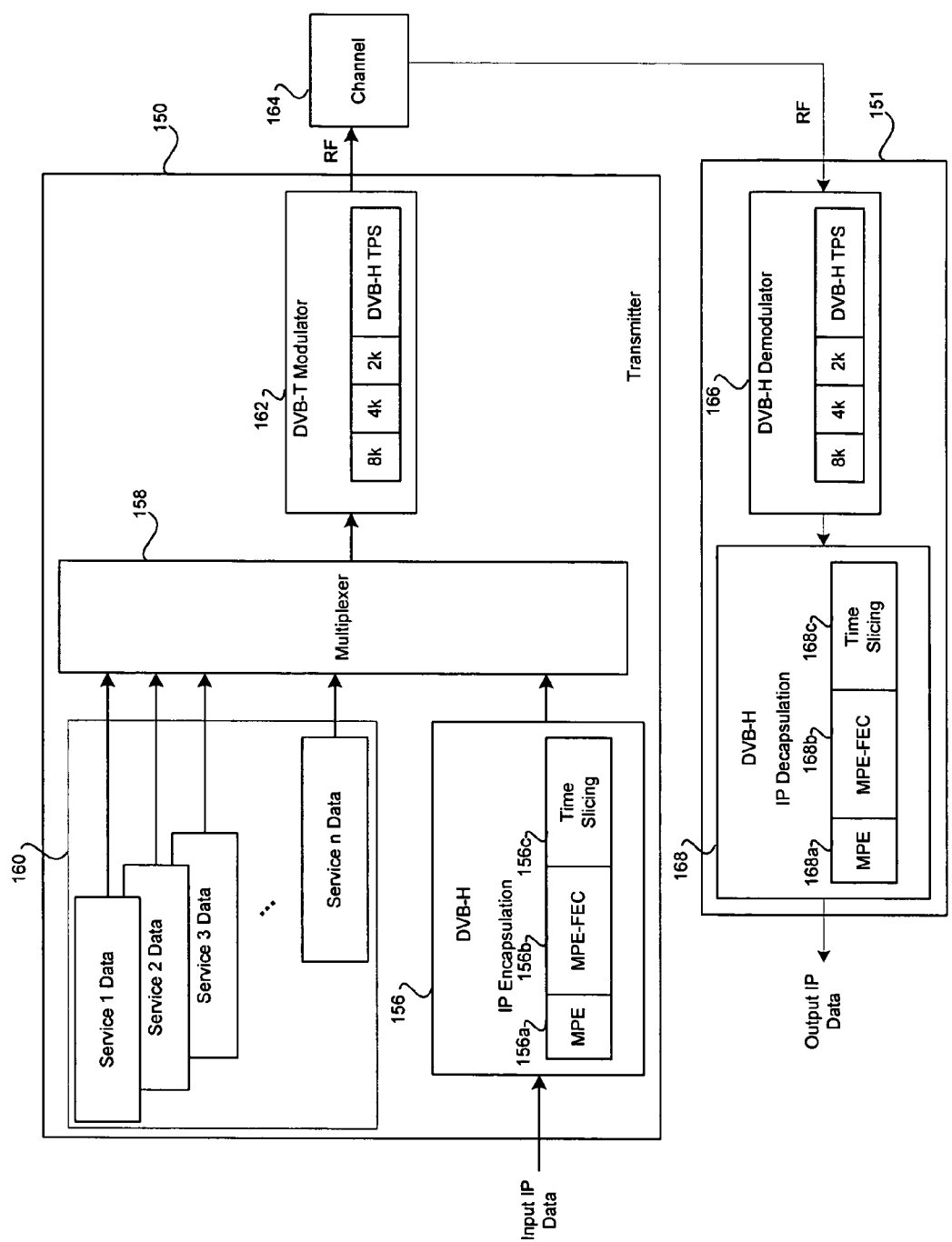
FIG. 1f is a block diagram illustrating the sharing of a multiplexer (MUX) by a plurality of MPEG2 services, which may be utilized in connection with an embodiment of the invention.

FIG. 1*f* is a block diagram illustrating the sharing of a multiplexer (MUX) by a plurality of MPEG2 services, which may be utilized in connection with an embodiment of the invention. Referring to FIG. 1*f*, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168. The DVB-H encapsulator block 156 may comprise MPE block 156*a*, MPE-FEC block 156*b* and time slicing block 156*c*. The multiplexer 156 may comprise suitable logic circuitry and/or code that may be adapted to handle multiplexing of IP encapsulated DVB-H data and service data. The plurality of service data collectively referenced as 160 may comprise MPEG-2 formatted data, which may comprise for example, audio, video and/or data. The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1e. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2A:
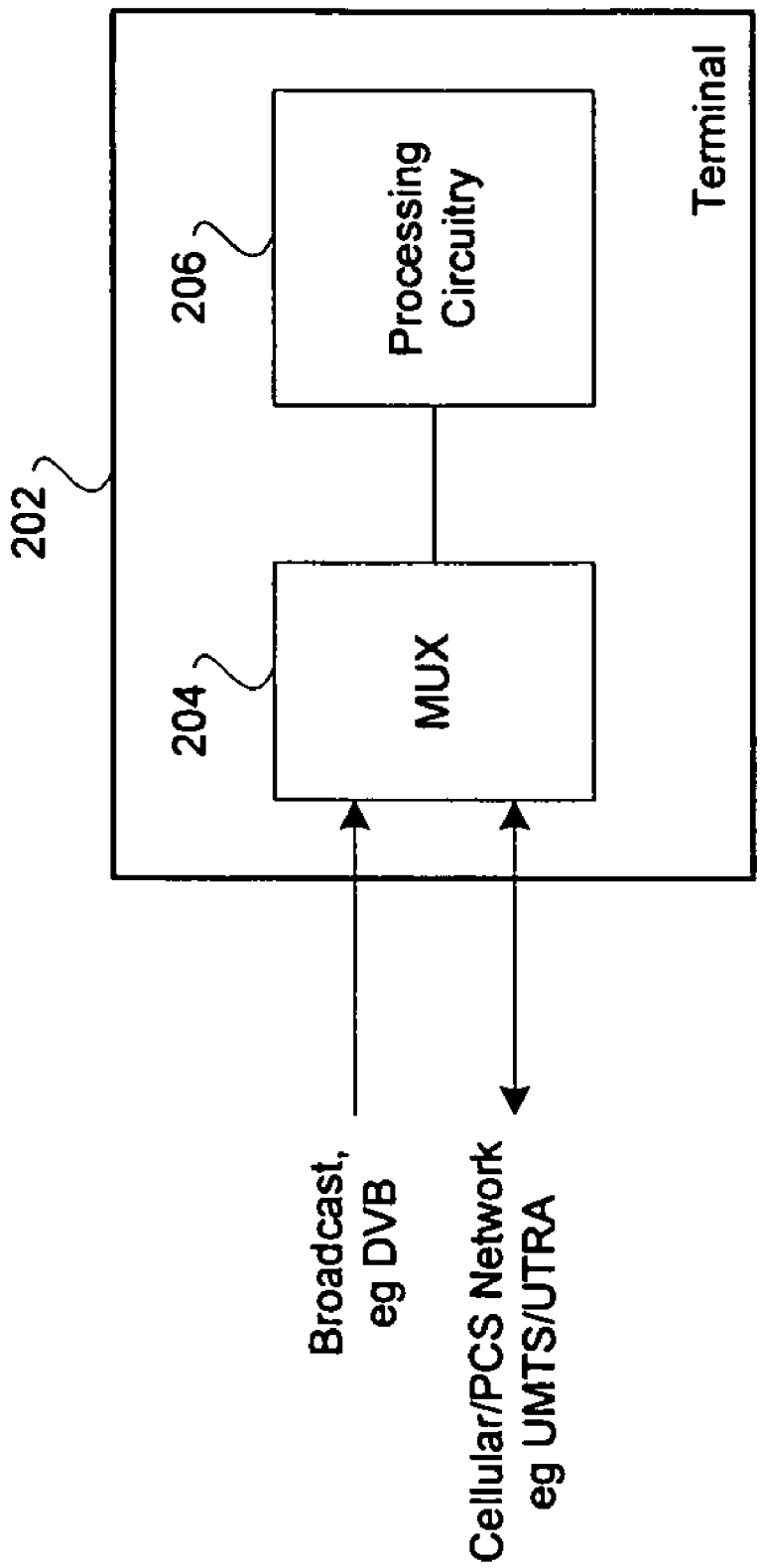
FIG. 2a is a block diagram of a mobile terminal that is adapted to receive VHF/UHF broadcasts and cellular communications, in accordance with an embodiment of the invention.

FIG. 2a is a block diagram of a mobile terminal that is adapted to receive VHF/UHF broadcasts and cellular communications, in accordance with an embodiment of the invention. Referring to FIG. 2a, there is shown mobile terminal (MT) or handset 202. The mobile terminal 202 may comprise multiplexer (MUX) 204 and processing circuitry 206.

The multiplexer 204 may comprise suitable logic circuitry and/or code that may be adapted to multiplex incoming signals, which may comprise VHF/UHF broadcast channel and at least one cellular channel. The cellular channel may be within the range of both cellular and PCS frequency bands.

The processing circuitry 206 may comprise, for example, an RF integrated circuit (RFIC) or RF front end (RFFE). In this regard, the processing circuitry 206 may comprise at least one receiver front end (RFE) circuit. A first of these circuits may be adapted to handle processing of the VHF/UHF broadcast channel and a second of these circuits may be adapted to handle a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio.

Figure 2B:
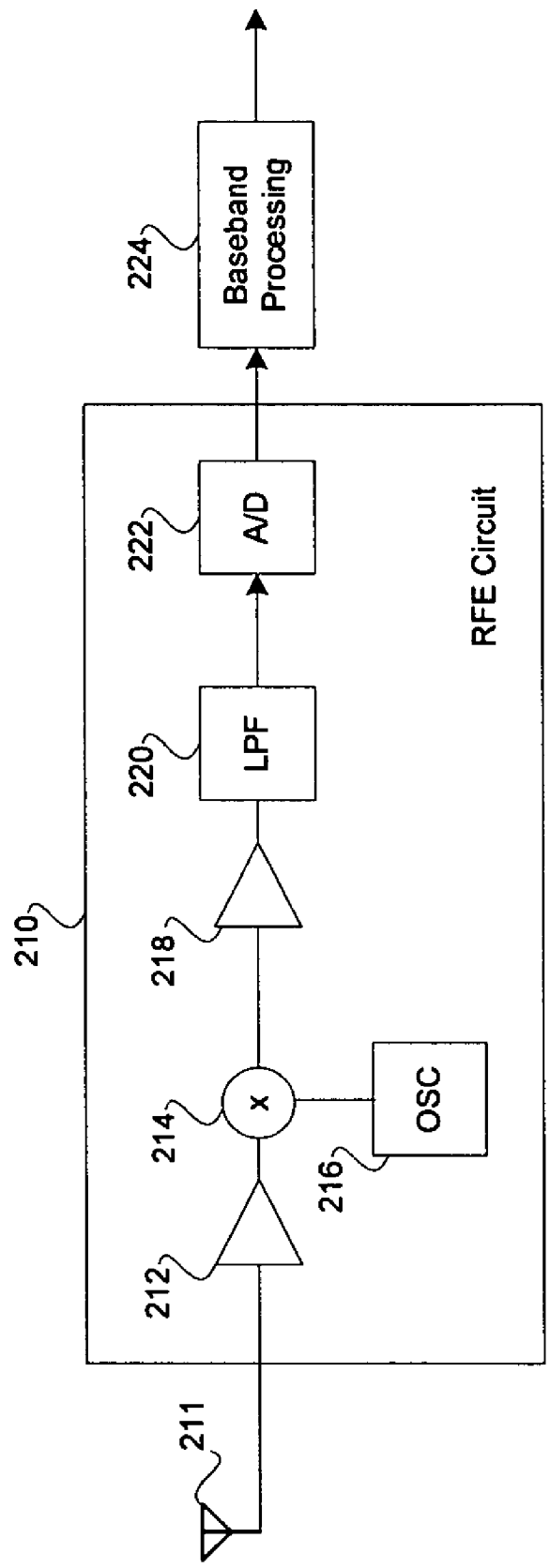
FIG. 2b is a block diagram illustrating receive processing circuit of an RF integrated circuit (RFIC), in accordance with an embodiment of the invention.

FIG. 2b is a block diagram illustrating receive processing circuit of an RF integrated circuit (RFIC), in accordance with an embodiment of the invention. Referring to FIG. 2b, there is shown antenna 211, receiver front end (RFE) circuit 210, and baseband processing block 224. The receiver front end (RFE) circuit 210 may comprise a low noise amplifier (LNA) 212, a mixer 214, an oscillator 216, a low noise amplifier or amplifier or amplifier 218, a low pass filter 220 and an analog-to-digital converter (A/D) 222.

The antenna 211 may be adapted to receive at least one of a plurality of signals. For example, the antenna 211 may be adapted to receive a plurality of signals in the GSM band, a plurality of signals in the WCDMA and and/or a plurality of signals in the VHF/UHF band. U.S. application Ser. No. 11/010,883, U.S. application Ser. No. 11/011,006, U.S. application Ser. No. 11/010,481, all of which are filed on Dec. 13, 2004 and disclose various antenna configurations that may be utilized for a plurality of operating frequency bands.

The receiver front end (RFE) circuit 210 may comprise suitable circuitry, logic and/or code that may be adapted to convert a received RF signal down to baseband. An input of the low noise amplifier 212 may be coupled to the antenna 211 so that it may receive RF signals from the antenna 211. The low noise amplifier 212 may comprise suitable logic, circuitry, and/or code that may be adapted to receive an input RF signal from the antenna 211 and amplify the received RF signal in such a manner that an output signal generated by the low noise amplifier 212 has a very little additional noise.

The mixer 214 in the RFE circuit 210 may comprise suitable circuitry and/or logic that may be adapted to mix an output of the low noise amplifier 212 with an oscillator signal generated by the oscillator 216. The oscillator 216 may comprise suitable circuitry and/or logic that may be adapted to provide a oscillating signal that may be adapted to mix the output signal generated from the output of the low noise amplifier 212 down to a baseband. The low noise amplifier (LNA) or amplifier 218 may comprise suitable circuitry and/or logic that may be adapted to low noise amplify and output signal generated by the mixer 214. An output of the low noise amplifier or amplifier 218 may be communicated to the low pass filter 220. The low pass filter 220 may comprise suitable logic, circuitry and/or code that may be adapted to low pass filter the output signal generated from the output of the low noise amplifier 220. The low pass filter block 220 retains a desired signal and filters out unwanted signal components such as higher signal components comprising noise. An output of the low pass filter 220 may be communicated to the analog-digital-converter for processing.

The analog-to-digital converter (A/D) 222 may comprise suitable logic, circuitry and/or code that may be adapted to convert the analog signal generated from the output of the low pass filter 220 to a digital signal. The analog-to-digital converter 222 may generate a sampled digital representation of the low pass filtered signal that may be communicated to the baseband-processing block 224 for processing. The baseband processing block 224 may comprise suitable logic, circuitry and/or code that may be adapted to process digital baseband signals received form an output of the A/D 222. Although the A/D 222 is illustrated as part of the RFE circuit 210, the invention may not be so limited. Accordingly, the A/D 222 may be integrated as part of the baseband processing block 224. In operation, the RFE circuit 210 is adapted to receive RF signals via antenna 211 and convert the received RF signals to a sampled digital representation, which may be communicated to the baseband processing block 224 for processing.

Figure 3:
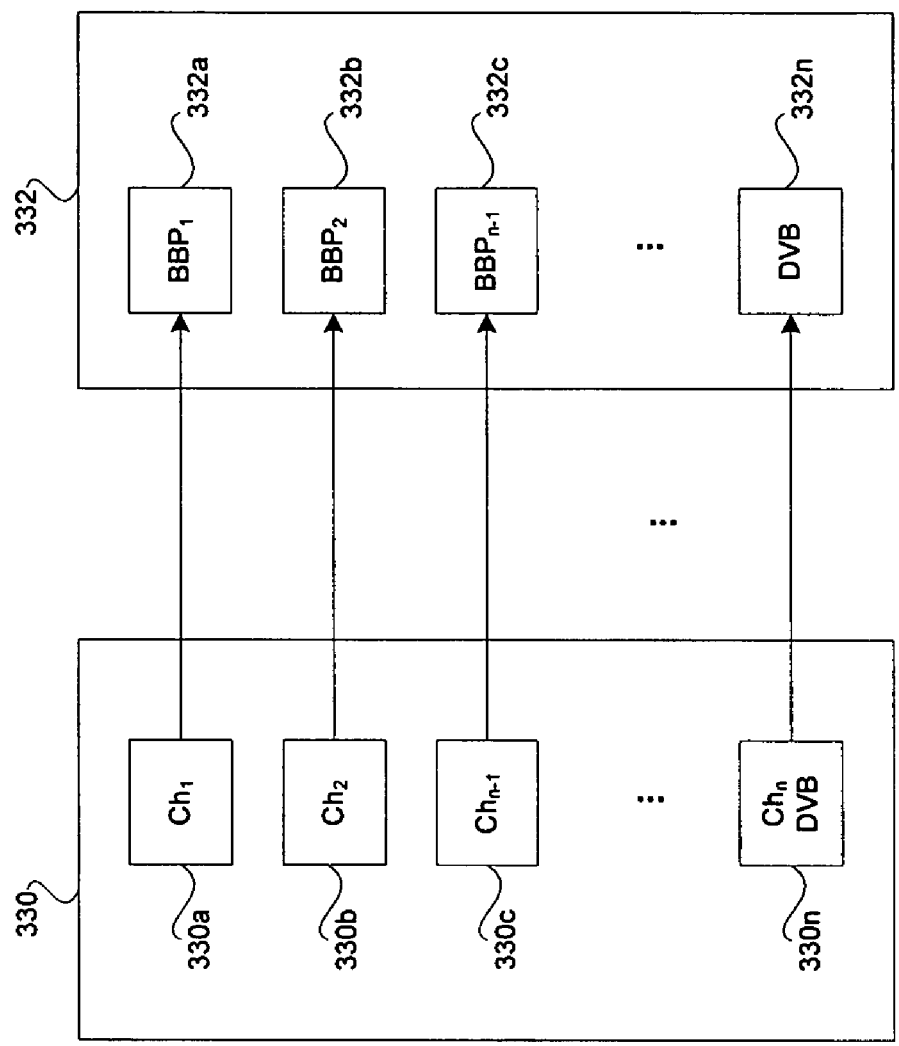
FIG. 3 is a high-level block diagram illustrating an exemplary configuration for a RFIC and a base band processing circuit, in accordance with an embodiment of the invention.

FIG. 3 is a high-level block diagram illustrating an exemplary configuration for a RFIC and a base band processing circuit, in accordance with an embodiment of the invention. Referring to FIG. 3, there is shown RFIC 330 and baseband circuitry 332. The RFIC 330 comprises a plurality of RF processing circuits 330a, 330b, 330c and 330n. The RF processing circuits 330a, 330b, 330c and 330n may be integrated in a single integrated circuit (IC) or chip. The baseband processing circuitry 332 comprises a plurality of baseband processing circuits 332a, 332b, 332c and 332n. The baseband processing circuits 332a, 332b, 332c and 332n may be integrated into a single integrated circuit (IC) or chip.

In operation, each of the RF processing circuits in the RFIC 330 may be adapted to process a single channel. For example, each of the RF processing circuits 330a, 330b and 330c may be adapted to process separate cellular channel, namely, channel 1, channel 2 and channel (n-1), respectively. The RF processing circuit 330n many be adapted to process a VHF/UHF broadcast channel n.

Each of the baseband processing circuits in the baseband processing circuitry 330 may be adapted to process a single channel. For example, each of the baseband processing circuits 332a, 332b and 332c may be adapted to process separate cellular channels, namely, channel 1, channel 2 and channel (n-1), respectively. The RF processing circuit 332*n* may be adapted to process a VHF/UHF broadcast channel n. Use of a single RFIC and a single baseband processing integrated circuit saves on the size of the processing circuitry, which may significantly reduce cost.

Figure 4A:
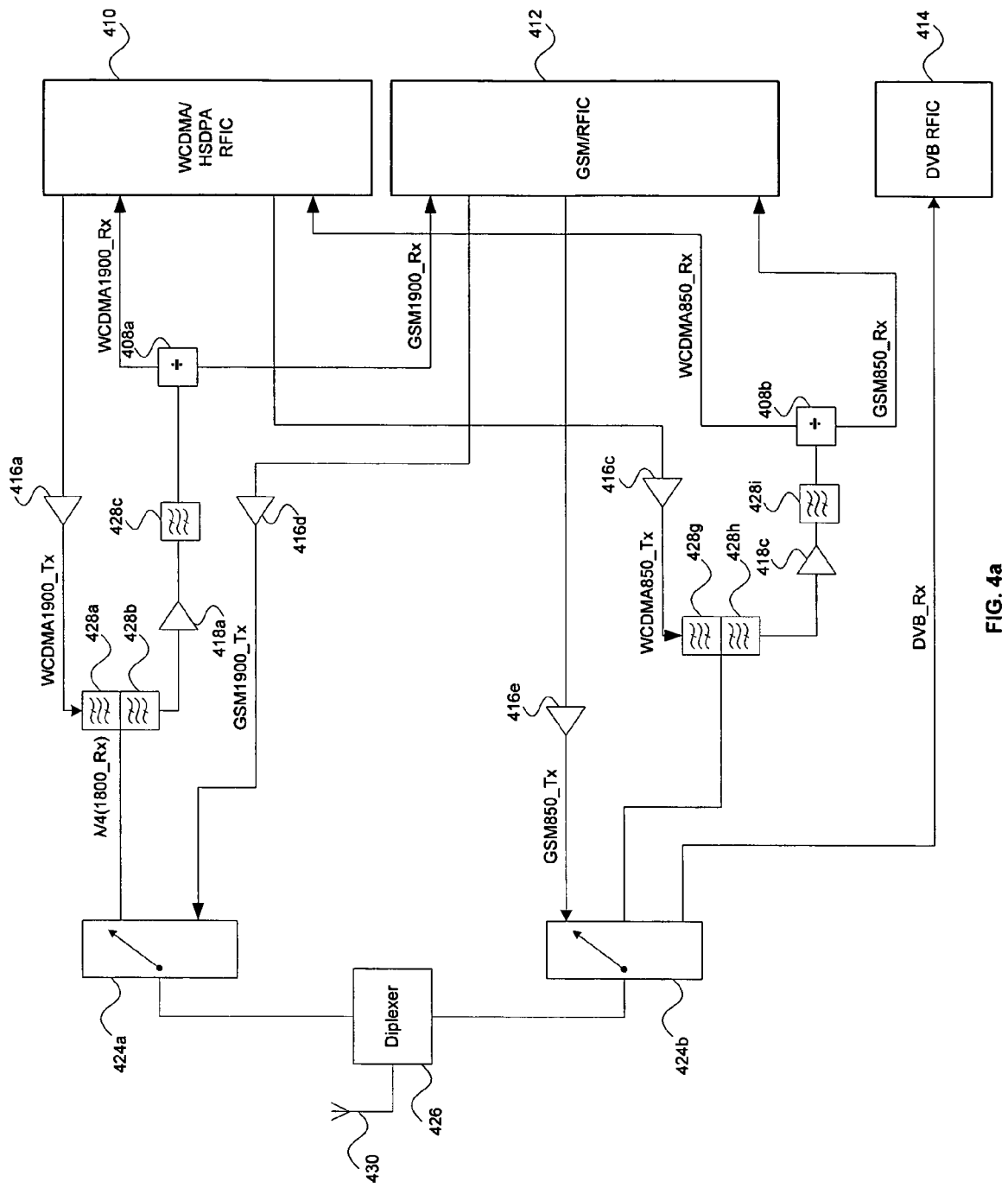
FIG. 4a is a block diagram of an exemplary mobile receiver single antenna architecture for handling US band cellular and broadcast services, in accordance with an embodiment of the invention.

FIG. 4*a* is a block diagram of an exemplary mobile receiver dual antenna architecture for handling US band cellular and broadcast services, in accordance with an embodiment of the invention. Referring to FIG. 4*a*, there is shown a WCDMA/HSDPA radio frequency integrated circuit (RFIC) 410, a GSM RFIC 412, a DVB RFIC 414, a plurality of dividers 408*a* and 408*b*, a plurality of power amplifiers 416*a*, 416*c*, 416*d* and 416*e*, a plurality of low noise amplifiers 418*a* and 418*c*, a plurality of switches 424*a* and 424*b*, a diplexer 426, a plurality of polyphase filters 428*a*, 428*b*, 428*c*, 428*g*, 428*h* and 428*i* and an antenna 430.

The WCDMA/HSDPA RFIC 410 may comprise suitable logic, circuitry and/or code that may be adapted to receive and transmit a WCDMA/HSDPA channel to process RF voice, data and/or control information. This channel may be divided into overlapping physical and logical channels. The physical channels may be uniquely defined by spreading codes and the logical channels, for example, control, voice and data channels may comprise a group of bits, frames and fields. The GSM RFIC 412 may comprise suitable logic, circuitry and/or code that may be adapted to receive and transmit a plurality of RF channels in the 900 MHz and the 1800 MHz band, for example. The radio channel structure for a GSM mobile station may be frequency division duplex (FDD), for example. By utilizing the FDD channel division, where data may be transmitted on one frequency and received on another frequency, the mobile terminal may receive and transmit at different times. The radio frequency separation of forward (downlink) and reverse (uplink) frequencies on the 900 MHz band may be 45 MHz, for example. The transmit band for the base station may be 935 MHz-960 MHz, for example, and the transmit band for the mobile terminal may be 890 MHz-915 MHz, for example. Similarly, the transmit band for the base station in the 1800 MHz band may be 1805 MHz-1880 MHz, for example, and the transmit band for the mobile terminal in the 1800 MHz band may be 1710 MHz-1785 MHz, for example. The DVB RFIC 414 may comprise suitable logic, circuitry and/or code that may be adapted to receive and deliver multimedia and other data to a mobile terminal via a VHF/UHF broadcast channel, for example. The payload utilized by DVB-H may be either IP datagrams or other network layer datagrams encapsulated into multiprotocol encapsulated sections. Although DVB is contemplated, other VHF/UHF broadcast standards such as ATSC or ISDB may be utilized.

The power amplifiers (PA) 416*a*, 416*c*, 416*d* and 416*e* may be adapted to provide a high output current to drive an antenna which may be a low-impedance load. The PA 416*a* and 416*c* may be adapted to amplify the signal received from the WCDMA/HSDPA RFIC 410 and transmit it to the polyphase filters 428*a* and 428*g* respectively. The PA 416*d* and 416*e* may be adapted to amplify the signal received from the GSM RFIC 412 and transmit it to the switches 424*a* and 424*b* respectively. The low noise amplifiers LNA 418*a* and 418*c* may comprise suitable logic, circuitry, and/or code that may be adapted to amplify the output of the polyphase filters 428*b* and 428*h* respectively.

The switch 424*a* may comprise suitable logic, circuitry, and/or code that may be adapted to switch between a transmit or receive channel for the WCDMA and GSM 1900 MHz band channels. The switch 424*b* may comprise suitable logic, circuitry, and/or code that may be adapted to switch between a transmit or receive channel for the GSM 850 MHz band channel and a receive channel for the DVB broadcast channel. The diplexer 426 may comprise suitable logic, circuitry, and/or code that may be adapted to parallely feed a single antenna, for example, antenna 430 to two transmitters at the same or different frequencies without the transmitters interfering with each other. The diplexer 426 may couple a transmitter and receiver to the same antenna, for example, antenna 430 for use in mobile communications.

The polyphase filters 428*a*, 428*b*, 428*c*, 428*g*, 428*h* and 428*i* may be adapted to selectively filter signals without the need of using high Q bandpass sections. Selectivity may be ensured by utilizing polyphase signals and a plurality of low-pass filter sections where matching driven power consumption is a variable. The polyphase filter 428*a* may be adapted to receive the amplified output from the power amplifier 416*a* and generate, for example, a quad wavelength ($\lambda/4$) output to the switch 424*a* by selectively filtering the WCDMA transmit channel. The polyphase filter 428*b* may be adapted to receive, for example, the quad wavelength ($\lambda/4$) output of the switch 424*a* and generate an output to the LNA 418*a*. The polyphase filter 428*c* may be adapted to receive the amplified output from the LNA 418*a* and generate an output to the divider 408*a*. The divider 408*a* may be adapted to split the received output from the polyphase filter 428*c* into two channels, for example, one of which may be a WCDMA 1900 MHz band receive channel that may be input to the WCDMA/HSDPA RFIC 410 and the other may be a GSM 1900 MHz band receive channel that may be input to the GSM RFIC 412. The polyphase filter 428*c* may be adapted to output frequencies within personal communications service (PCS) 1900 band, for example.

The polyphase filter 428*g* may be adapted to receive the amplified output from the power amplifier 416*c* and generate, for example, a quad wavelength ($\lambda/4$) output to the switch 424*b* by selectively filtering the WCDMA 850 MHz transmit channel. The polyphase filter 428*h* may be adapted to receive, for example, the quad wavelength ($\lambda/4$) output of the switch 424*b* and generate an output to the LNA 418*c*. The polyphase filter 428*i* may be adapted to receive the amplified output from the LNA 418*c* and generate an output to the divider 408*b*. The divider 408*b* may be adapted to split the received output from the polyphase filter 428*i* into two signals, for example, one of which may be a WCDMA 850 MHz band receive channel that may be input to the WCDMA/HSDPA RFIC 410 and the other may be a GSM 850 MHz band receive channel that may be input to the GSM RFIC 412. The antenna 430 may be adapted to transmit and receive signals to and from the diplexer 426. The antenna 430 may be adapted to transmit and receive signals to the diplexer 426.

The antenna 430 may be coupled to the diplexer 426. The diplexer 426 may be coupled to a plurality of switches for example, 424*a* and 424*b*. The switch 424*a* may be adapted to switch between one or more states. In one state, for example, the switch 424*a* may be coupled to the polyphase filters 428*a* and 428*b* in the WCDMA 1900 MHz band transmit and receive channels respectively. In another state, for example, the switch 424*a* may be coupled to the PA 416*d* in the GSM 1900 MHz band transmit channel. The switch 424*b* may be adapted to switch between one or more states. In one state, for example, the switch 424*b* may be coupled to the PA 416*e* in the GSM 850 MHz band transmit channel. In another state, for example, the switch 424*b* may be coupled to the polyphase filters 428*g* and 428*h* in the WCDMA 850 MHz band transmit and receive channels respectively. In another state, for example, the switch 424*b* may be coupled to the DVB RFIC 414 via the VHF/UHF broadcast channel.

The WCDMA/HSDPA RFIC 410 may be coupled to the power amplifier 416a in the transmit section of the WCDMA 1900 MHz band channel and may be coupled to the polyphase filter 428c in the receive section of the WCDMA 1900 MHz band channel. The output of the power amplifier 416a may be coupled to the polyphase filter 428a. The LNA 418a may be coupled to the output of the polyphase filter 428b and the input of the polyphase filter 428c. The GSM RFIC 412 may be coupled to the input of the PA 416d in the GSM 1900 MHz band transmit channel and may be coupled to the input of the PA 416e in the 850 MHz transmit channel.

Figure 4B:
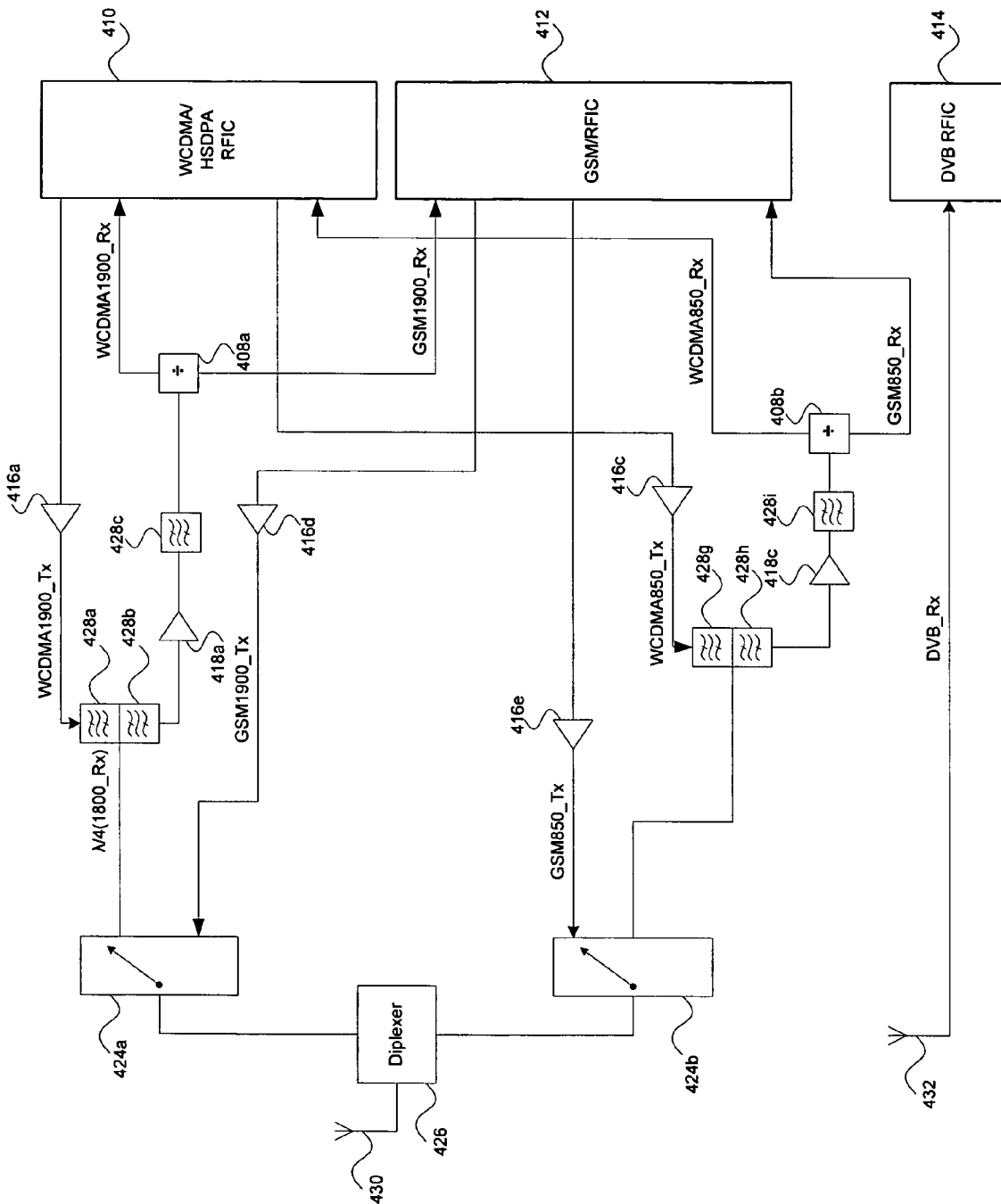
FIG. 4b is a block diagram of an exemplary mobile receiver dual antenna architecture for handling US band cellular and broadcast services, in accordance with an embodiment of the invention.

FIG. 4b is a block diagram of an exemplary mobile receiver dual antenna architecture for handling US band cellular and broadcast services, in accordance with an embodiment of the invention. FIG. 4b is similar to FIG. 4a, except that the DVB RFIC 414 may be decoupled from the switch 424b and may be coupled directly to the antenna 432.

Figure 4C:
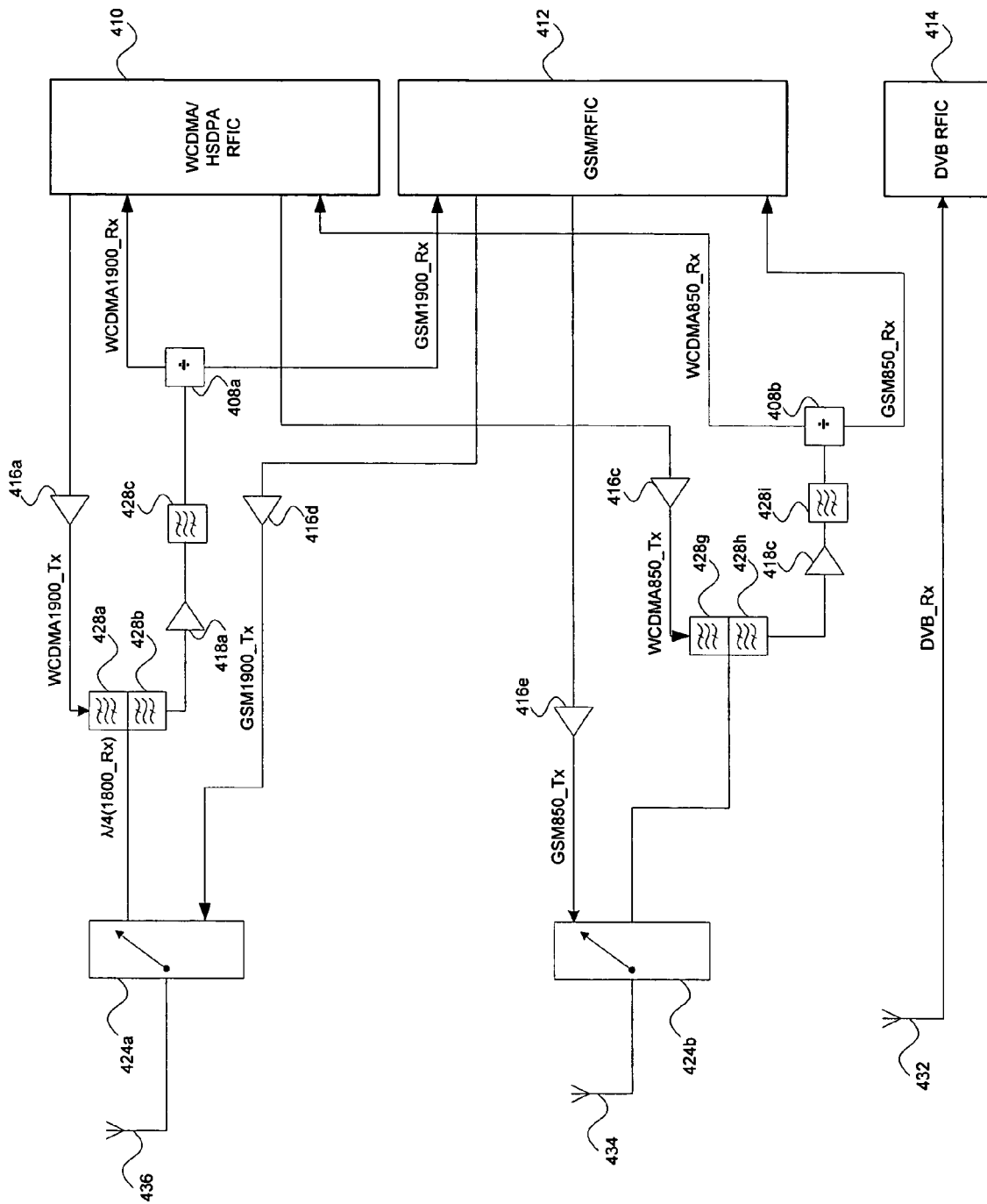
FIG. 4c is a block diagram of an exemplary mobile receiver single antenna architecture for handling US band cellular and broadcast services, in accordance with an embodiment of the invention.

FIG. 4c is a block diagram of an exemplary mobile receiver multiple antenna architecture for handling US band cellular and broadcast services, in accordance with an embodiment of the invention. FIG. 4c is similar to FIG. 4b, except that the diplexer 426 may be removed and the switches 424a and 424b may be directly coupled to the antennas 436 and 434 respectively.

Figure 4D:
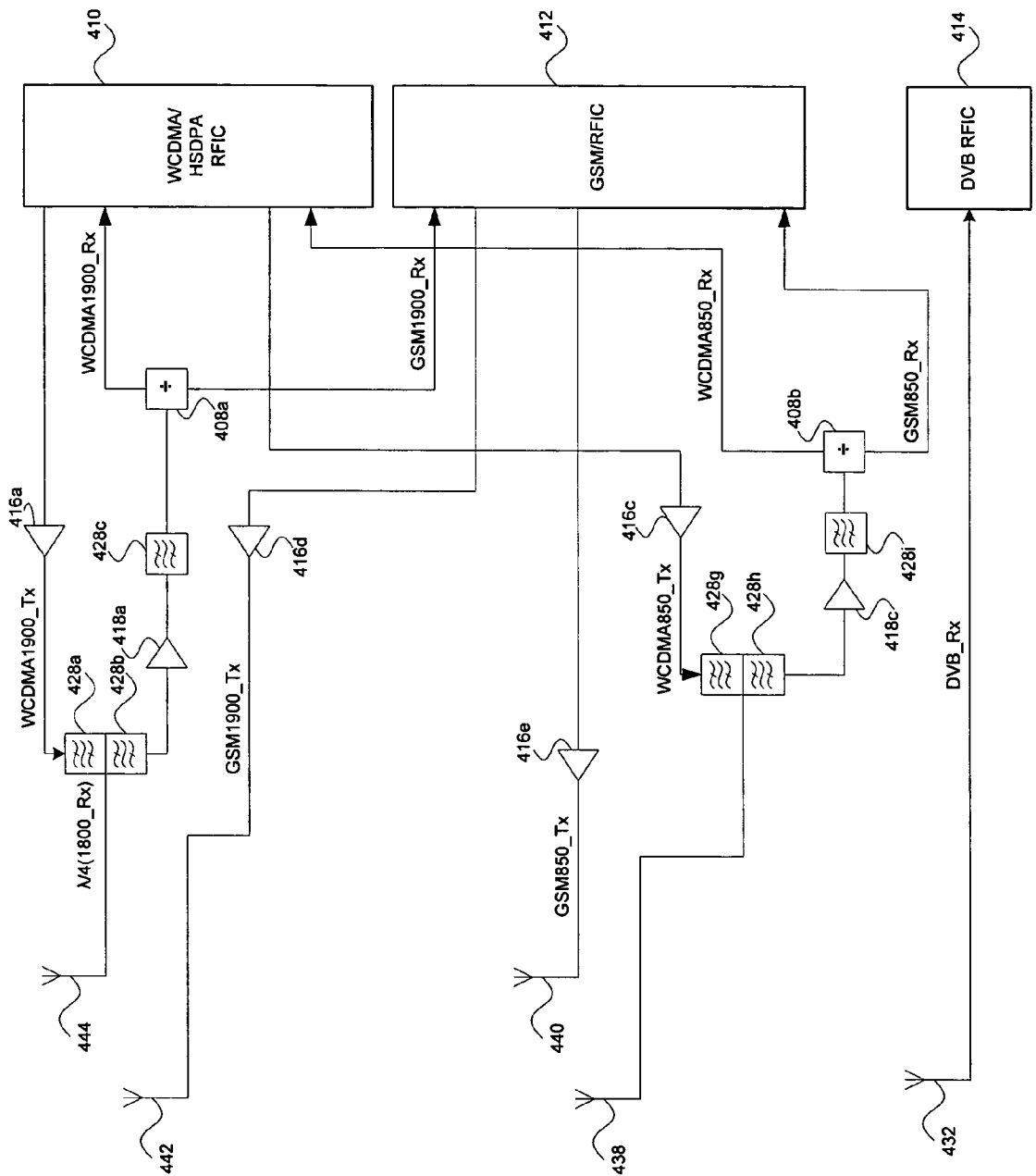
FIG. 4d is a block diagram of an exemplary mobile receiver multiple antenna architecture for handling US band cellular and broadcast services, in accordance with an embodiment of the invention.

FIG. 4d is a block diagram of an exemplary mobile receiver multiple antenna architecture for handling US band cellular and broadcast services, in accordance with an embodiment of the invention. FIG. 4d is similar to FIG. 4c, except that the antenna 436, switch 424a, antenna 434 and switch 424b may be removed. The antenna 444 may be coupled to the polyphase filters 428a and 428b in the WCDMA 1900 MHz band transmit and receive channel respectively. The antenna 442 may be coupled to the PA 416d in the GSM 1900 MHz band transmit channel. The antenna 438 may be coupled to the polyphase filters 428g and 428h in the WCDMA 850 MHz band transmit and receive channel respectively. The antenna 440 may be coupled to the PA 416e in the GSM 850 MHz band transmit channel. The antenna 432 may be coupled to the DVB RFIC 414 via the DVB channel.

Figure 4E:
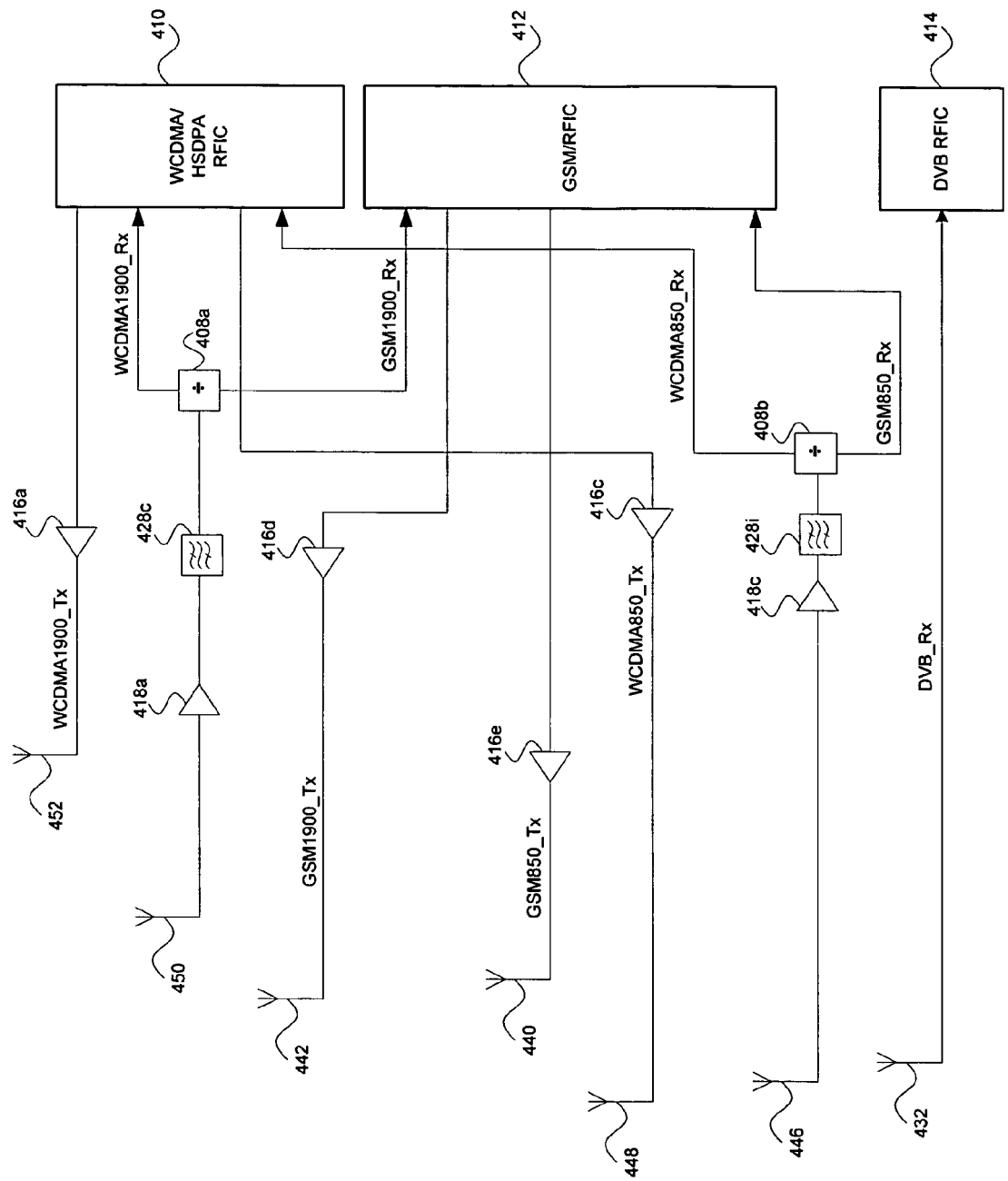
FIG. 4e is a block diagram of an exemplary mobile receiver multiple antenna architecture for handling US band cellular and broadcast services, in accordance with an embodiment of the invention.

FIG. 4e is a block diagram of an exemplary mobile receiver dual antenna architecture for handling US band cellular and broadcast services, in accordance with an embodiment of the invention. FIG. 4e is similar to FIG. 4d, except that the antenna 444 may be replaced with two antennas, for example, antennas 450 and 452. The antenna 452 may be directly coupled to the PA 416a in the WCDMA 1900 MHz band transmit channel. The antenna 450 may be coupled directly to the LNA 418a in the WCDMA/GSM 1900 MHz band receive channel. The antenna 438 may be replaced with two antennas, for example, antennas 446 and 448. The antenna 448 may be directly coupled to the PA 416c in the WCDMA 850 MHz band transmit channel. The antenna 446 may be coupled directly to the LNA 418c in the WCDMA/GSM 850 MHz band receive channel.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for an antenna architecture that handles US band cellular and broadcast channels, the system comprising:
    a first radio frequency integrated circuit (RFIC) integrated within a mobile terminal coupled to at least a first antenna capable of handling signals within a 1900 MHz band;
    a second RFIC integrated within said mobile terminal coupled to said first antenna capable of handling signals within at least one of a 1900 MHz band and a 850 MHz band; and
    a third RFIC integrated within said mobile terminal coupled to said first antenna capable of handling signals within a VHF and/or UHF broadcast band.

2. The system according to claim 1, wherein said first RFIC is a WCDMA/HSDPA RFIC.

3. The system according to claim 1, wherein said second RFIC is a GSM RFIC.

4. The system according to claim 1, wherein said third RFIC is a DVB RFIC.

5. The system according to claim 1, comprising a diplexer and a first switch, wherein said first RFIC is coupled to said first antenna via said first switch and said diplexer.

6. The system according to claim 5, wherein said second RFIC is coupled to said first antenna via said first switch and said diplexer.

7. The system according to claim 6, comprising a second switch, wherein said third RFIC is coupled to said first antenna via said second switch and said diplexer.

8. The system according to claim 7, wherein said second RFIC is coupled to said first antenna via said second switch and said diplexer.

9. The system according to claim 1, comprising a first amplifier, wherein an output of said first RFIC is coupled to an input of at least said first amplifier.

10. The system according to claim 9, comprising a first polyphase filter, wherein an output of said first amplifier is coupled to an input of at least said first polyphase filter.

11. The system according to claim 10, comprising an output of said first polyphase filter coupled to an input of a first switch.

12. The system according to claim 11, comprising a second polyphase filter, wherein an output of said first switch is coupled to an input of at least said second polyphase filter.

13. The system according to claim 12, comprising a second amplifier, wherein an output of said second polyphase filter is coupled to an input of at least said second amplifier.

14. The system according to claim 13, comprising a third polyphase filter, wherein an output of said second amplifier is coupled to an input of at least said third polyphase filter.

15. The system according to claim 14, comprising a first divider, wherein an output of said third polyphase filter is coupled to an input of said first divider.

16. The system according to claim 15, comprising an output of said first divider coupled to an input of said first RFIC capable of handling signals within said 1900 MHz band and an input of said second RFIC capable of handling signals within said 1900 MHz band.

17. The system according to claim 1, comprising a third amplifier, wherein an output of said second RFIC is coupled to an input of at least said third amplifier.

18. The system according to claim 17, comprising an output of said third amplifier coupled to an input of a first switch in a transmit path capable of handling signals within said 1900 MHz band.

19. The system according to claim 18, wherein said third amplifier is a power amplifier.

20. The system according to claim 1, comprising a fourth amplifier, wherein an output of said second RFIC is coupled to an input of at least said fourth amplifier.

21. The system according to claim 20, wherein said fourth amplifier is a power amplifier.

22. The system according to claim 1, comprising a fifth amplifier, wherein an output of said second RFIC is coupled to an input of at least said fifth amplifier.

23. The system according to claim 22, comprising a fourth polyphase filter, wherein an output of said fifth amplifier is coupled to an input of at least said fourth polyphase filter.

24. The system according to claim 23, comprising an output of said fourth polyphase filter coupled to an input of a second switch.

25. The system according to claim 24, comprising a fifth polyphase filter, wherein an output of said second switch is coupled to an input of at least said fifth polyphase filter.

26. The system according to claim 25, comprising a sixth amplifier, wherein an output of said fifth polyphase filter is coupled to an input of at least said sixth amplifier.

27. The system according to claim 26, comprising a sixth polyphase filter, wherein an output of said sixth amplifier is coupled to an input of at least said sixth polyphase filter.

28. The system according to claim 27, comprising a second divider, wherein an output of said sixth polyphase filter is coupled to an input of said second divider.

29. The system according to claim 28, comprising an output of said second divider coupled to an input of said first RFIC capable of handling signals within said 850 MHz band and an input of said second RFIC capable of handling signals within said 850 MHz band.

30. The system according to claim 29, wherein said output of said second switch coupled to an input of said third RFIC.

31. The system according to claim 1, wherein said first antenna coupled to an input of said third RFIC.

32. The system according to claim 1, comprising a first switch and a second antenna, wherein said second antenna is coupled to said first RFIC via said first switch.

33. The system according to claim 32, wherein said second antenna is coupled to said second RFIC via said first switch.

34. The system according to claim 33, wherein said third antenna is coupled to said second RFIC via a second switch.

35. The system according to claim 34, wherein said second antenna is coupled to an input of said first switch.

36. The system according to claim 35, wherein said third antenna is coupled to an input of said second switch.

37. The system according to claim 1, comprising a fourth antenna and a fourth polyphase filter, wherein said fourth antenna is coupled to said first RFIC via said fourth polyphase filter in a transmit path capable of handling signals within said 850 MHz band.

38. The system according to claim 37, comprising a fifth polyphase filter, wherein said fourth antenna is coupled to said first RFIC and said second RFIC via said fifth polyphase filter in a receive path capable of handling signals within said 850 MHz band.

39. The system according to claim 38, wherein said fourth antenna is coupled to an input of said fifth polyphase filter.

40. The system according to claim 1, comprising a fifth antenna and a fourth amplifier, wherein said fifth antenna is coupled to said second RFIC via said fourth amplifier in a transmit path capable of handling signals within said 850 MHz band.

41. The system according to claim 40, comprising an output of said fourth amplifier coupled to said fifth antenna.

42. The system according to claim 1, comprising a sixth antenna and a first polyphase filter, wherein said sixth antenna is coupled to said first RFIC via said first polyphase filter in a transmit path capable of handling signals within said 1900 MHz band.

43. The system according to claim 42, comprising a second polyphase filter, wherein said sixth antenna is coupled to said first RFIC and said second RFIC via said second polyphase filter in a receive path capable of handling signals within said 1900 MHz band.

44. The system according to claim 43, wherein said sixth antenna is coupled to an input of said second polyphase filter.

45. The system according to claim 1, comprising a seventh antenna and a third amplifier, wherein said seventh antenna is coupled to said second RFIC via said third amplifier in a transmit path capable of handling signals within said 1900 MHz band.

46. The system according to claim 45, comprising an output of said third amplifier coupled to said seventh antenna.

47. The system according to claim 1, comprising an eighth antenna, a sixth amplifier and a sixth polyphase filter, wherein said eighth antenna is coupled to said first RFIC and said second RFIC via said sixth amplifier and said sixth polyphase filter in a receive path capable of handling signals within said 850 MHz band.

48. The system according to claim 47, wherein said sixth amplifier is a low noise amplifier.

49. The system according to claim 1, comprising a ninth antenna and a fifth amplifier, wherein said ninth antenna is coupled to said first RFIC via said fifth amplifier in a transmit path capable of handling signals within said 850 MHz band.

50. The system according to claim 49, wherein said fifth amplifier is a power amplifier.

51. The system according to claim 1, comprising a tenth antenna, a second amplifier and a third polyphase filter, wherein said tenth antenna is coupled to said first RFIC and said second RFIC via said second amplifier and said third polyphase filter in a receive path capable of handling signals within said 1900 MHz band.

52. The system according to claim 51, wherein said second amplifier is a low noise amplifier.

53. The system according to claim 1, comprising an eleventh antenna and a first amplifier, wherein said eleventh antenna is coupled to said first RFIC via said first amplifier in a transmit path capable of handling signals within said 1900 MHz band.

54. The system according to claim 53, wherein said first amplifier is a power amplifier.

55. A method for an antenna architecture that handles US band cellular and broadcast channels, the method comprising:
   receiving at a first radio frequency integrated circuit (RFIC) integrated within a mobile terminal, first signals via a first antenna, said first signals comprising signals within a 1900 MHz band;
   receiving at a second RFIC integrated within said mobile terminal, second signals via said first antenna, said second signals comprising signals within at least one of a 1900 MHz band and a 850 MHz band; and
   receiving at a third RFIC integrated within said mobile terminal, third signals via said first antenna, said third signals comprising signals within a VHF and/or UHF broadcast band.

56. The method according to claim 55, wherein said first RFIC is a WCDMA/HSDPA RFIC.

57. The method according to claim 55, wherein said second RFIC is a GSM RFIC.

58. The method according to claim 55, wherein said third RFIC is a DVB RFIC.

\* \* \* \* \*

UNITED STATES PATENT AND TRADEMARK OFFICE
CERTIFICATE OF CORRECTION

PATENT NO. : 7,430,438 B2  Page 1 of 1
APPLICATION NO. : 11/010487
DATED : September 30, 2008
INVENTOR(S) : Pieter Gert Wessel van Rooyen It is certified that error appears in the above-identified patent and that said Letters Patent is hereby corrected as shown below:

Column 7, line 49, delete the word "single" and insert the word --multiple--.

Column 17, line 7, delete the word "dual" and insert the word --single--.

Column 19, line 42, delete the word "dual" and insert the word --multiple--.

Signed and Sealed this

Eleventh Day of November, 2008

JON W. DUDAS
*Director of the United States Patent and Trademark Office*